United States Patent
Kardos

(10) Patent No.: US 8,015,954 B2
(45) Date of Patent: Sep. 13, 2011

(54) COOLING FAN ARRANGEMENT AT A VEHICLE

(75) Inventor: Zoltan Kardos, Södertälje (SE)

(73) Assignee: Scania CV AB (PUBL) (SE)

( * ) Notice: Subject to any disclaimer, the term of this patent is extended or adjusted under 35 U.S.C. 154(b) by 308 days.

(21) Appl. No.: 12/295,781

(22) PCT Filed: Apr. 18, 2007

(86) PCT No.: PCT/SE2007/050251
§ 371 (c)(1),
(2), (4) Date: Oct. 2, 2008

(87) PCT Pub. No.: WO2007/126372
PCT Pub. Date: Nov. 8, 2007

(65) Prior Publication Data
US 2009/0159021 A1    Jun. 25, 2009

(30) Foreign Application Priority Data
Apr. 28, 2006  (SE) ....................... 0600947

(51) Int. Cl.
*F01P 7/02* (2006.01)
(52) U.S. Cl. ....... 123/41.12; 123/563; 60/599; 180/68.1
(58) Field of Classification Search .............. 123/41.01, 123/41.51, 41.49, 41.48, 41.31, 41.29, 41.12, 123/41.11, 563; 60/599; 180/68.1, 68.2, 180/68.3, 68.4
See application file for complete search history.

(56) References Cited

U.S. PATENT DOCUMENTS

| | | | | |
|---|---|---|---|---|
| 3,377,023 A | * | 4/1968 | Costa et al. ....................... | 236/35 |
| 3,394,682 A | | 7/1968 | Wolf-Dieter Bensinger | |
| 3,853,098 A | * | 12/1974 | Ishikawa et al. ........... | 123/41.11 |
| 3,894,521 A | * | 7/1975 | Sakasegawa et al. ...... | 123/41.12 |
| 4,156,408 A | * | 5/1979 | Protze ......................... | 123/41.51 |
| 4,441,462 A | * | 4/1984 | Budinski .................... | 123/41.11 |
| 4,485,624 A | * | 12/1984 | Melchior ....................... | 60/599 |
| 4,539,942 A | * | 9/1985 | Kobayashi et al. ........... | 123/41.1 |
| 4,590,892 A | * | 5/1986 | Nose et al. .................. | 123/41.12 |
| 4,726,325 A | * | 2/1988 | Itakura ......................... | 123/41.1 |

(Continued)

FOREIGN PATENT DOCUMENTS

GB          905002          9/1962

(Continued)

OTHER PUBLICATIONS

International Search Report dated Aug. 20, 2007, issued in corresponding international application No. PCT/SE2007/050251.

*Primary Examiner* — Noah Kamen
*Assistant Examiner* — Hung Q Nguyen
(74) *Attorney, Agent, or Firm* — Ostrolenk Faber LLP

(57) ABSTRACT

A radiator fan arrangement for a vehicle which is powered by a combustion engine. The radiator fan arrangement includes at least one cooling element for cooling a medium, and a first radiator fan for continuously generating a forced air flow through at least one first region of the cooling element in order to cool the medium during operation of the combustion engine. The radiator fan arrangement also includes at least one extra radiator fan for being activated to generate an increased air flow through at least one second region of said cooling element in situations where the first radiator fan cannot provide sufficient air flow to cool as necessary the medium in the cooling element.

15 Claims, 2 Drawing Sheets

U.S. PATENT DOCUMENTS

| | | | | |
|---|---|---|---|---|
| 4,938,303 A | * | 7/1990 | Schaal et al. | 180/68.1 |
| 4,979,584 A | * | 12/1990 | Charles | 180/68.1 |
| 5,180,003 A | * | 1/1993 | Kouzel et al. | 165/121 |
| 5,277,547 A | * | 1/1994 | Washizu | 415/208.1 |
| 5,660,149 A | * | 8/1997 | Lakerdas et al. | 123/41.44 |
| 5,826,549 A | * | 10/1998 | Martin | 123/41.11 |
| 5,910,099 A | * | 6/1999 | Jordan et al. | 60/599 |
| 6,035,955 A | * | 3/2000 | Suzuki et al. | 180/68.1 |
| 6,070,560 A | | 6/2000 | Johnston et al. | |
| 6,817,831 B2 | * | 11/2004 | Stevens et al. | 415/61 |
| 6,840,743 B2 | * | 1/2005 | Herke et al. | 417/2 |
| 7,406,835 B2 | * | 8/2008 | Allen et al. | 62/179 |

FOREIGN PATENT DOCUMENTS

JP    59010727    1/1984

* cited by examiner

COOLING FAN ARRANGEMENT AT A VEHICLE

CROSS REFERENCE TO RELATED APPLICATION

The present application is a 35 U.S.C. §§371 national phase conversion of PCT/SE2007/050251, filed 18 Apr. 2007, which claims priority of Swedish Application No. 0600947-6, filed 28 Apr. 2006. The PCT International Application was published in the English language.

BACKGROUND TO THE INVENTION, AND STATE OF THE ART

The present invention relates to a radiator fan arrangement for a vehicle and particularly to an arrangement including the continuously operated cooling fan and another selectively operable cooling fan.

A vehicle powered by a combustion engine usually comprises a radiator for cooling the coolant which cools the combustion engine. A radiator fan is usually arranged close to the radiator in order to provide a forced air flow through the radiator with the object of cooling the coolant. Conventional radiator fans are usually powered by the combustion engine via a permanent mechanical connection. The magnitude of the air flow which the radiator fan generates through the radiator will thus vary with the engine's speed. Many heavy vehicles are powered by supercharged combustion engines. A charge air cooler is used for cooling the supercharged air before it is led to the combustion engine. A charge air cooler is usually situated in front of the ordinary radiator at the front portion of the vehicle. In some cases a condenser of an air conditioning system may also be situated close to the vehicle's front portion, as also an EGR cooler for cooling of returned exhaust gases.

Where one or more such cooling elements are arranged in front of an ordinary radiator, the air flow reaching the radiator will be at a higher temperature. The coolant cooled in the radiator will thus be subject to a reduced cooling effect. To compensate for this reduced cooling effect, a greater air flow may be forced through the coolers. One way of increasing the air flow through the coolers is to provide the ordinary radiator fan's mechanical connection to the combustion engine with a higher gear ratio, but for practical reasons it is only possible to increase the gear ratio up to a certain limit. When there is a high ambient temperature and the combustion engine is running at low speed, it may therefore be difficult to provide enough air flow through the coolers to effect acceptable cooling of, above all, the coolant, since these coolers are often situated downstream from one or more other cooling elements with respect to the direction of the cooling air flow.

U.S. Pat. No. 3,894,521 refers to a radiator fan which provides an air flow through a radiator for cooling of coolant and a condenser of an air conditioning system. In that case, the radiator fan is connected to an engine and an electric motor via separate coupling mechanisms so that either the engine or the electric motor can be used for powering the radiator fan. When the engine rotates at a speed which is too low for the radiator fan to supply a necessary air flow through the radiator, the electric motor takes over the operation of the radiator fan momentarily and imparts to it a higher speed.

SUMMARY OF THE INVENTION

The object of the present invention is to provide a radiator fan arrangement which can when necessary provide an increased forced air flow through a cooling element so that necessary cooling of a medium in the cooling element is achieved relatively easily and effectively.

This object is achieved with the radiator fan arrangement of the kind mentioned in the introduction which is characterised by the features of the invention.

Operating the vehicle thus involves using a first radiator fan which continuously generates a forced flow of air through the cooling element, thereby providing in most operating situations a necessary cooling of the medium in the cooling element. The cooling effect exerted by an air flow on a warm medium within a cooling element depends on temperature of the air and the amount of air flowing through the radiator. In situations where, for example, there is a high surrounding air temperature or the medium in the cooling element is at a high temperature, there is always risk that the existing air flow generated by the first radiator fan will not be sufficient to provide necessary cooling of the medium. For example, the temperature of the medium rising above an acceptable level will cause activation of the extra radiator fan which will then together with the first radiator fan provide an increased forced air flow through the cooling element. This activation of the extra radiator fan may continue until the temperature of the medium drops to an acceptable level. Alternatively the extra radiator fan may be activated as soon as a component which requires relatively large cooling of the medium is activated. Such a component may be a retarder, which will in many cases be cooled by the combustion engine's cooling system.

According to a preferred embodiment of the present invention, the radiator arrangement comprises an electric motor adapted to being activated in order to power the extra radiator fan. The result is the powering of a relatively simple extra radiator fan which is easy to activate. The electric motor and the extra radiator fan may be dimensioned to run at a substantially constant speed when they are activated. The extra radiator fan will thus provide a substantially constant increased air flow through the cooling element. It is also possible to run the electric motor and the extra radiator fan at a variable speed depending on the amount of cooling needed for the medium in the cooling element. According to another alternative, the radiator arrangement may comprise a coupling mechanism which makes it possible to set up a connection between the combustion engine and the extra radiator fan and thereby operate the extra radiator fan by means of the combustion engine. Such an extra radiator fan will, when activated, provide an increased air flow through the cooling element in an amount which will vary with the combustion engine's speed.

According to another embodiment of the invention, the radiator arrangement comprises a permanent connection between the combustion engine and the first radiator fan so that the first radiator fan is powered continuously by the combustion engine, in which case the first radiator fan may take the form of a conventional radiator fan. The magnitude of the forced air flow through the cooling element thus provided by the first radiator fan will be related to the combustion engine's speed. Alternatively, the radiator arrangement may comprise an electric motor adapted to continuously powering the first radiator fan when the combustion engine is activated. Such an electric motor and first radiator fan may take the form of a unit run at substantially constant speed, which in all operating states of the vehicle will result in substantially constant forced air flow through the cooling element. In this case, cooling the medium will not entail any problems in operating situations where the combustion engine is idling or running at low speed, which may be a disadvantage of using a first radiator fan powered by the combustion engine.

According to another preferred embodiment of the invention, the first radiator fan and the extra radiator fan are so situated relative to one another that they provide substantially parallel air flows through at least partly different regions of the cooling element. Placing the extra radiator fan beside the first radiator fan with respect to the intended air flow direction through the cooling element will result in a broader air flow through the cooling element when both of the radiator fans are activated. Suitable positioning of the extra radiator fan relative to the first radiator fan will make it possible substantially to provide the cooling element with a more homogeneous cooling air flow resulting in uniform cooling of the medium in the cooling element. With advantage, the radiator arrangement comprises a control unit adapted to activating the extra radiator fan on the basis of information from at least one sensor which detects a parameter related to the temperature of the medium when it leaves the cooling element. If the control unit receives information from the sensor which indicates that the medium is at too high a temperature when it leaves the cooling element, the control unit will find that the cooling of the medium in the cooling element is insufficient. The control unit will thereupon activate the extra radiator fan so that there is increased forced air flow through the cooling element and hence increased cooling of the medium in the cooling element. When the first radiator fan receives information from the sensor that the temperature of the medium has dropped to an acceptable temperature level, it will switch off the extra radiator fan.

According to another preferred embodiment of the invention, said cooling element is a radiator intended to cool a coolant in a cooling system for cooling the combustion engine. Where two or more cooling elements are used in a vehicle, the radiator for the coolant is usually situated downstream from other cooling elements with respect to the direction of the cooling air flow, since the coolant need not normally be cooled to as low a temperature as the media in other cooling elements. Thus the coolant in the radiator will be cooled by an air flow which is at a higher temperature than the surroundings. This increases the risk that the coolant may not be subject to a necessary cooling in the radiator. It is therefore particularly advantageous to use an extra radiator fan according to the present invention for providing an increased cooling air flow in cases where the radiator for the coolant is situated downstream from other cooling elements. Other cooling elements such as, for example, a charge air cooler may need an increased cooling air flow in operating situations where air is subject to great compression in a turbo unit. It is important that the air in a charge air cooler be cooled to a relatively low temperature if the combustion engine is to achieve high performance.

According to another preferred embodiment of the invention, said cooling elements, the first radiator fan and the extra radiator fan are fitted in a region situated at a front portion of the vehicle. In this region commonly used as the location for cooling elements, a natural air flow through the cooling element is also provided by the vehicle's motion, thereby also helping to cool the medium in the cooling element.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
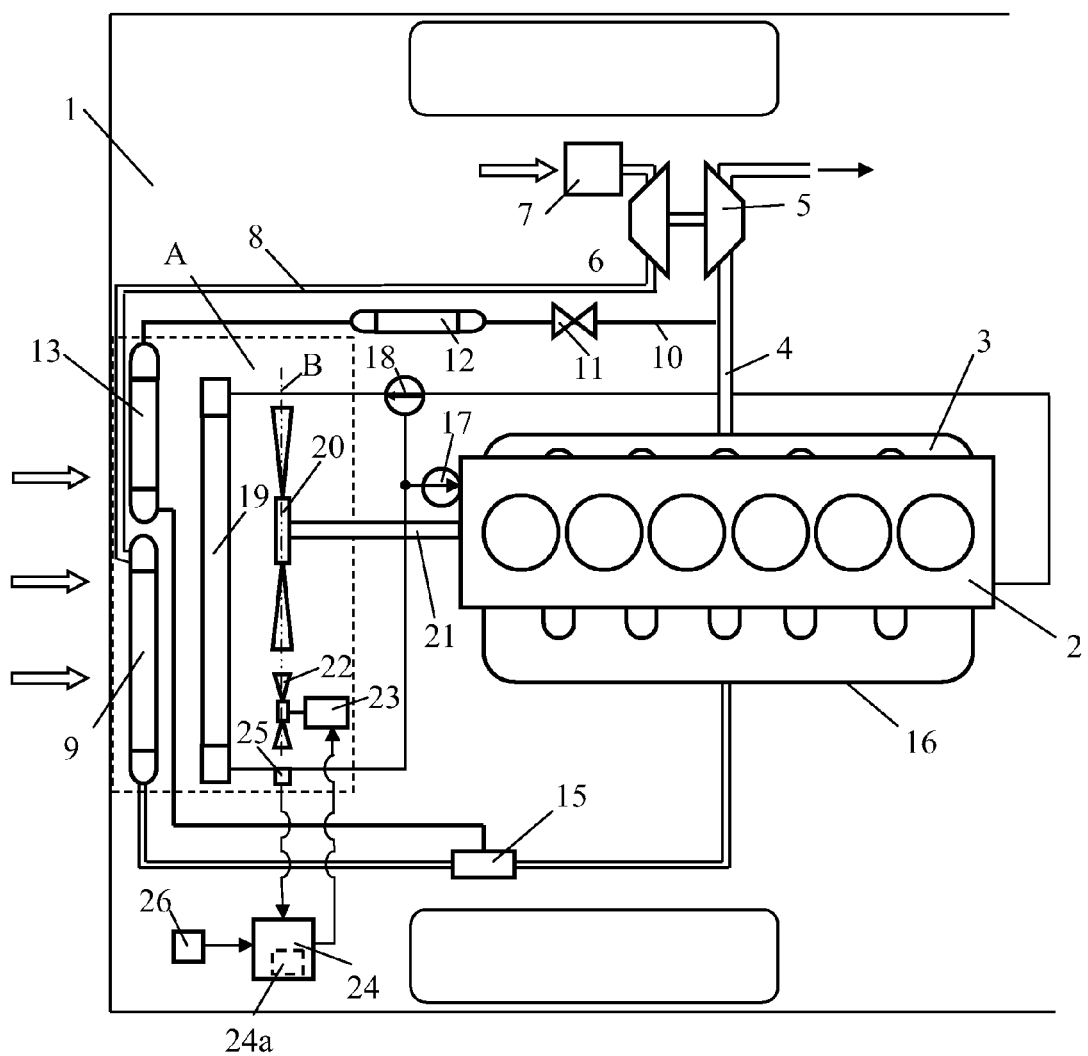
FIG. 1 depicts a vehicle with a radiator fan arrangement according to a first embodiment of the present invention.

FIG. 1 depicts a vehicle 1 powered by a supercharged combustion engine 2. The vehicle 1 may be a heavy vehicle powered by a supercharged diesel engine. The exhaust gases from the cylinders of the combustion engine 2 are led via an exhaust manifold 3 to an exhaust line 4. The exhaust gases in the exhaust line 4, which will be at above atmospheric pressure, are led to a turbine 5 of a turbo unit. The turbine 5 is thereby provided with driving force which is transmitted, via a connection, to a compressor 6. The compressor 6 thereupon compresses air which is led via an air filter 7 into an inlet line 8. A charge air cooler 9 is arranged in the inlet line 8. The purpose of the charge air cooler 9 is to cool the compressed air before it is led to the combustion engine 2.

The combustion engine 2 is provided with an EGR (Exhaust Gas Recirculation) system for recirculation of exhaust gases. Adding exhaust gases to the compressed air which is led to the engine's cylinders lowers the combustion temperature and hence also the content of nitrogen oxides ($NO_x$) formed during the combustion processes. A return line 10 for recirculation of exhaust gases extends from the exhaust line 4 to the inlet line 8. The return line 10 comprises an EGR valve 11 by means of which the exhaust flow in the return line 10 can be shut off. The EGR valve 11 may also be used for steplessly controlling the amount of exhaust gases which is led from the exhaust line 4 to the inlet line 8 via the return line 10. The return line 10 comprises a first EGR cooler 12 for providing the exhaust gases with a first step of cooling and a second EGR cooler 13 for providing the exhaust gases with a second step of cooling. The cooled exhaust gases are mixed with air in the inlet line by means of a mixer 15. When the exhaust gases have been mixed with the compressed air in the inlet line 8, the mixture is led via a manifold 16 to the respective cylinders of the combustion engine 2.

The combustion engine 2 is cooled in a conventional manner by a cooling system which contains a circulating coolant. The coolant is circulated in the cooling system by a coolant pump 17. The cooling system also comprises a thermostat 18. The coolant in the cooling system is intended to be cooled in a radiator 19. The charge air cooler 9, the second EGR cooler 13 and the radiator 19 are all situated in a region A at a front portion of the vehicle 1. The respective coolers 9, 13 and the radiator 19 are intended to have air passing through them which is forced through the region A by a first radiator fan 20. The charge air cooler 9 and the second EGR cooler 13 are situated upstream from the radiator 19 with respect to the direction of air flow through the region A. The first radiator fan 20 is connected to the crankshaft of the combustion engine 2 by a schematically depicted permanent mechanical connection 21. Such a connection 21 may comprise a transmission which causes the radiator fan to run at a specified gear ratio relative to the speed of the combustion engine 2. The first radiator fan 20 will thus run at a speed which is related to the speed of the combustion engine 2. An extra radiator fan 22 is arranged in the region A beside the first radiator fan 20. The second radiator fan 22 is so arranged that it provides an air flow which is substantially parallel with the air flow provided by the first radiator fan 20. The extra radiator fan 22 has in this case an extent in a common plane B with the first radiator fan 20. The extra radiator fan 22 is powered by an electric motor 23. A control unit 24 is adapted to controlling the activation of the electric motor 23 and hence the extra radiator fan 22. The control unit 24 comprises software 24a adapted to controlling the extra radiator fan 22. The control unit 24 is adapted to receiving information from a sensor 25 which detects the temperature of the coolant after it has left the radiator 19. The control unit 24 is also adapted to receiving information from a brake unit 26 which detects whether a retarder which is cooled by the coolant in the cooling system is activated in the vehicle or not.

During operation of the combustion engine 2, the first radiator fan 20 is thus powered by the combustion engine 2 at a speed related to the speed of the combustion engine 2. The magnitude of the resulting air flow through the coolers and the radiator is thus also related to the speed of the combustion engine 2. The first radiator fan 20 is powered continuously via the permanent mechanical connection 21 when the combustion engine 2 is in operation. If the control unit 24 receives information from the sensor 25 that the coolant is at a temperature higher than a reference temperature when it leaves the radiator 19, it will find that the air flow provided by the first radiator fan 20 is not sufficient for cooling as necessary the coolant in the radiator 19. The control unit 24 will therefore activate the electric motor 23 and the extra radiator fan 22. The first radiator fan 20 and the extra radiator fan 22 will thus together provide increased air flow through the region A at the front portion of the vehicle 1, resulting in more effective cooling of the coolant in the radiator 19. When the coolant's temperature drops below a reference temperature, the control unit 24 will switch off the extra radiator fan 22. In this embodiment, the control unit 24 may also receive information from the brake unit 26 about whether the retarder is activated or not. When activated, a retarder requires powerful cooling of the coolant in the cooling system. On the basis of the information indicated above, the control unit 24 can directly activate the extra radiator fan 22 when the retarder is activated, in order thereby to increase the capacity of the radiator 19 for cooling the radiator coolant. In this situation, the extra radiator fan 22 may be started despite the coolant being at a temperature below the reference value.

Figure 2:
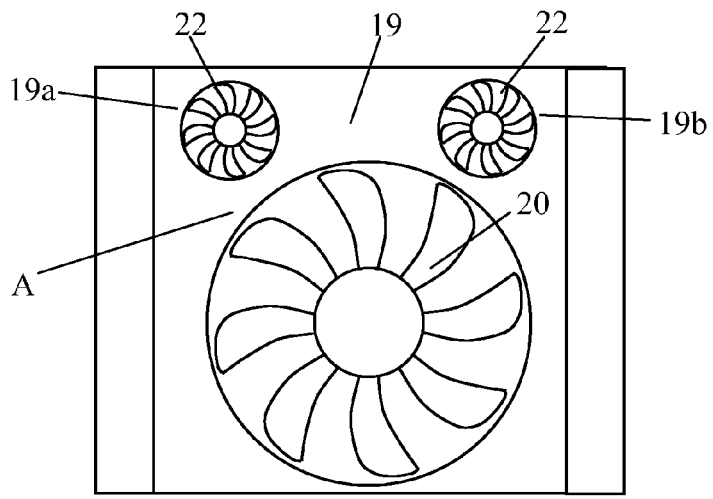
FIG. 2 depicts a radiator fan arrangement according to a second embodiment of the present invention and
FIG. 3 depicts a vehicle with a radiator fan arrangement according to a third embodiment of the present invention.

FIG. 2 depicts a front view of a first radiator fan 20 and two extra radiator fans 22 which are intended to be activated when the first radiator fan 20 cannot provide sufficient air flow for desired cooling of the coolant in the radiator 19. Radiator fans are usually axial fans which provide air flow within a substantially circular region. As a conventional radiator 19 has a substantially square shape transverse to the direction of air flow, the air flow in the radiator's edge regions, particularly the corner regions, will generally be rather small. The cooling of the medium in these regions will therefore often be deficient. To counter this, the extra radiator fans 22 are fitted so that there will be good air flow through the radiator's upper corner regions 19a, b when the extra radiator fans 22 are activated.

Figure 3:
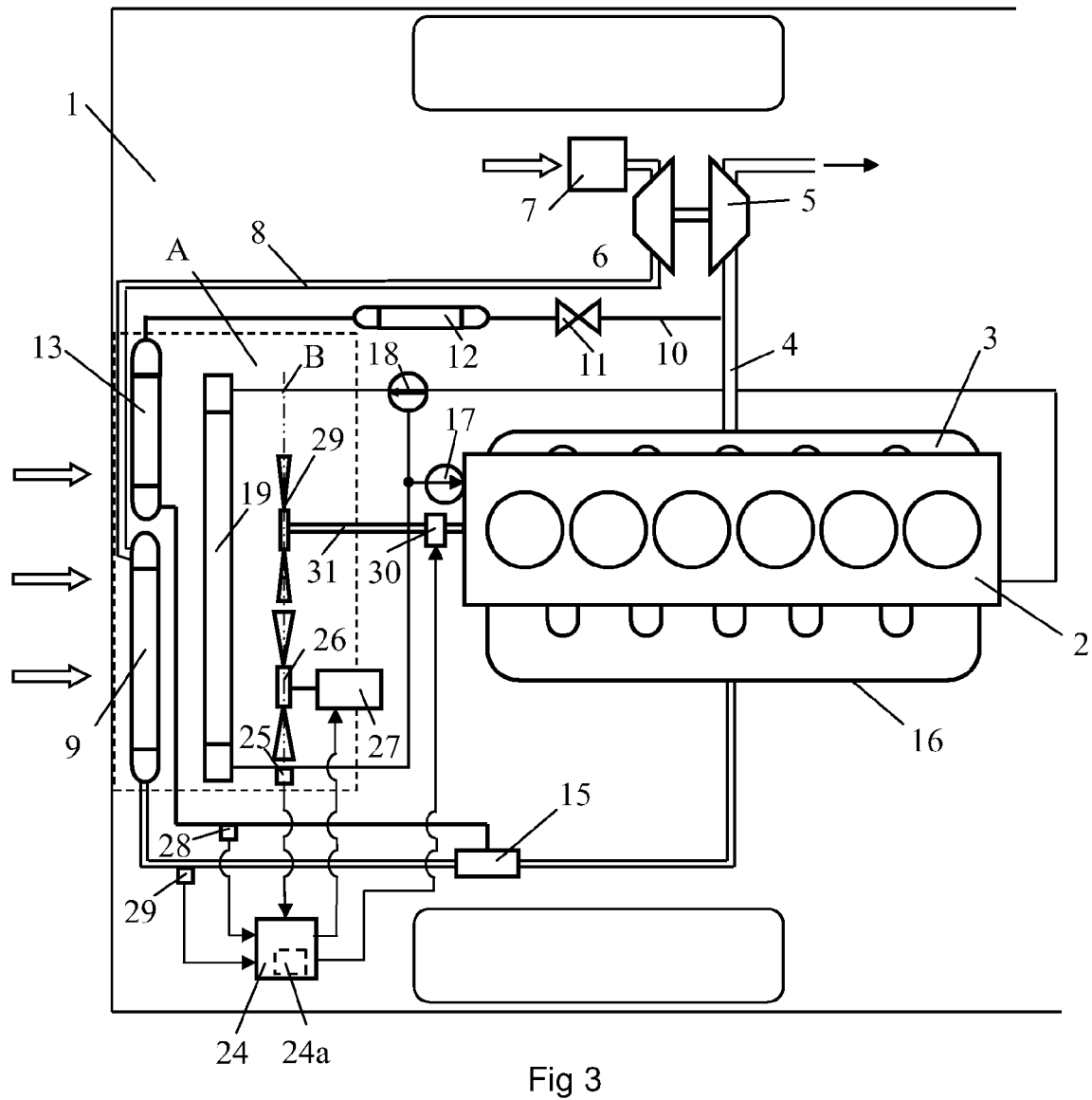

FIG. 3 depicts an alternative embodiment of the invention. In this case a first cooling fan 26 is powered continuously by an electric motor 27 when the combustion engine 2 is activated. An extra radiator fan 29 is powered in this case by the combustion engine 2. A coupling mechanism 30 is here arranged in a schematically depicted connection 31 between the combustion engine 2 and the extra radiator fan 29. It is possible for the extra radiator fan 29 to be drivingly connected to the combustion engine 2 via the coupling mechanism 30 in situations where the first radiator fan 26 cannot provide sufficient cooling air flow through the charge air cooler 9, the EGR cooler 13 and the radiator 19. It is also possible for the connection 31 between the combustion engine 2 and the extra radiator fan 29 via the coupling mechanism 30 to be broken when activation of the extra radiator fan 29 is not required. A control unit 24 is adapted to controlling the coupling mechanism 30 on the basis of information from a first sensor 25 which detects the coolant's temperature after it has left the radiator 19. The control unit 24 is also adapted to controlling the coupling mechanism 30 on the basis of information from a second sensor 28 which detects the temperature of the charge air after it has left the charge air cooler 9, and a third sensor 29 which detects the temperature of the returned exhaust gases after they have left the second EGR cooler 13. During operation of the combustion engine 2, the first radiator fan 26 is thus powered continuously by the electric motor 27. Such a first radiator fan 26 may be run at a substantially constant speed resulting in optimum air flow in relation to the power generated by the electric motor 27. The result will be substantially constant air flow through the coolers 9, 13 and the radiator 19 irrespective of the vehicle's operating state. If the control unit 24 receives information from one of the sensors 25, 28, 29 that the medium after passing through the respective coolers 9, 13 and the radiator 19 is at a temperature higher than a reference temperature, it will find that the first radiator fan 26 is not providing sufficient air flow for achieving necessary cooling of said medium. The control unit 24 will thereupon initiate activation of the coupling mechanism 30 so that the combustion engine 2 is connected to the extra radiator fan 29. The first radiator fan 26 and the extra radiator fan 29 will then together provide increased air flow through the coolers 9, 13 and the radiator 19. The cooling of the media in the respective coolers 9, 13 and the radiator 19 will increase. When the temperature of said medium drops back below the reference temperature, the control unit 24 will initiate disengagement of the coupling mechanism 30 so that the operation of the extra radiator fan 29 ceases.

The invention is in no way limited to the embodiments described with reference to the drawings but may be varied freely within the scopes of the claims. For example, any desired number of extra radiator fans may be activated when a first radiator fan cannot provide sufficient air flow to achieve desired cooling of the medium in a cooling element. The two extra radiator fans may be activated simultaneously. Alternatively, the second extra radiator fan may be activated only when the air flow generated by the first radiator fan and the first extra radiator fan is not sufficient to provide necessary cooling of a medium in a cooling element.

The invention claimed is:

1. A radiator fan arrangement for a vehicle powered by a combustion engine, the radiator fan arrangement comprising:
   at least one cooling element configured to cool a medium flowing to the combustion engine to cool the combustion engine;
   a second cooling element configured to cool gas or charge air before the gas or charge air is delivered to the combustion engine;
   a first radiator fan operable for continuously generating a forced air flow through at least one first region of the cooling element in order to cool the medium and through at least the first region of the second cooling element in order to cool the gas or charge air during operation of the combustion engine;
   at least one extra radiator fan selectively operable to generate an increased air flow through at least one second region of the cooling element and through at least the second region of the second cooling element in order to cool the gas or charge air, the first and second regions being at least partly different;
   a coupling mechanism connecting between the combustion engine and the extra radiator fan for powering the extra radiator fan by means of the combustion engine;

the radiator arrangement further having an electric motor operable to continuously power the first radiator fan at a substantially constant speed when the combustion engine is activated; and
a control unit configured to activate the at least one extra radiator fan only when extra airflow to the cooling elements is required to provide cooling for the cooling elements.

2. A radiator arrangement according to claim 1, wherein the first radiator fan and the extra radiator fan are situated relative to one another such that they provide substantially parallel air flows through the at least partly different respective first and second regions of the cooling element.

3. A radiator arrangement according to claim 1, further comprising at least one sensor operable to detect a parameter related to a temperature of the medium when the medium leaves the cooling element and for supplying the parameter as information to the control unit,
wherein the control unit is configured to activate the at least one extra radiator fan based on the information from the at least one sensor.

4. A radiator arrangement according to claim 1, wherein the cooling element comprises a radiator operable to cool the medium in the form of a coolant in the radiator,
wherein the radiator is in a cooling system for cooling the combustion engine.

5. A radiator arrangement according to claim 1, wherein the second cooling element comprises a charge air cooler operable to cool compressed air in the charge air cooler.

6. A radiator arrangement according to claim 1, wherein the cooling element, the first radiator fan and the extra radiator fan are fitted in a third region situated at a front portion of the vehicle.

7. The radiator fan arrangement according to claim 1, wherein the first radiator fan and the at least one extra radiator fan are both positioned at a first side of the at least one cooling element.

8. The radiator fan arrangement according to claim 7, further comprising a third radiator fan configured to generate an increased air flow through the at least one second region of the cooling element,
the extra radiator fan being positioned to provide air flow through a first corner region of the cooling element and the third fan being positioned to provide air flow through a second corner region of the cooling element different from the first corner region.

9. The radiator fan arrangement according to claim 1, wherein the first radiator fan and the at least one extra radiator fan are positioned to have longitudinal extents along a common plane.

10. The radiator fan arrangement according to claim 1, wherein the control unit is configured to activate the at least one extra fan when a vehicle device cooled by the medium cooled by the at least one cooling element is activated, the vehicle device being a device other than the combustion engine.

11. A radiator fan arrangement for a vehicle powered by a combustion engine, the radiator fan arrangement comprising:
at least one cooling element configured to cool a medium flowing to the combustion engine to cool the combustion engine;
a second cooling element configured to cool gas or charge air before the gas or charge air is delivered to the combustion engine;
a first radiator fan operable for continuously generating a forced air flow through at least one first region of the cooling element in order to cool the medium and through at least the first region of the second cooling element in order to cool the gas or charge air during operation of the combustion engine;
at least one extra radiator fan selectively operable to generate an increased air flow through at least one second region of the cooling element and through at least the second region of the second cooling element in order to cool the gas or charge air, the first and second regions being at least partly different;
a coupling mechanism connecting between the combustion engine and the first radiator fan for powering the first radiator fan by means of the combustion engine;
the radiator arrangement having an electric motor operable to continuously power at least one of the first radiator fan and the extra radiator fan at a substantially constant speed when the combustion engine is activated; and
a control unit configured to activate the at least one extra radiator fan only when extra airflow to the cooling elements is required to provide cooling for the cooling elements.

12. The radiator fan arrangement according to claim 11, wherein the first radiator fan and the at least one extra radiator fan are both positioned at a first side of the at least one cooling element.

13. The radiator fan arrangement according to claim 12, further comprising a third radiator fan configured to generate an increased air flow through the at least one second region of the cooling element,
the extra radiator fan being positioned to provide air flow through a first corner region of the cooling element and the third fan being positioned to provide air flow through a second corner region of the cooling element different from the first corner region.

14. The radiator fan arrangement according to claim 11, wherein the first radiator fan and the at least one extra radiator fan are positioned to have longitudinal extents along a common plane.

15. The radiator fan arrangement according to claim 11, wherein the control unit is configured to activate the at least one extra fan when a vehicle device cooled by the medium cooled by the at least one cooling element is activated, the vehicle device being a device other than the combustion engine.

* * * * *